(12) United States Patent
Gruber et al.

(10) Patent No.: US 8,839,945 B2
(45) Date of Patent: Sep. 23, 2014

(54) ORDER-PICKING SYSTEM FOR ORDER-PICKING ARTICLES INTO ORDER CONTAINERS

(75) Inventors: Michael Gruber, Friesach (AT); Franz Bauer-Kieslinger, Friesach (AT); Oliver Springstubbe, München (DE)

(73) Assignee: Salomon Automation GbmH, Friesach (AT)

( * ) Notice: Subject to any disclaimer, the term of this patent is extended or adjusted under 35 U.S.C. 154(b) by 293 days.

(21) Appl. No.: 12/936,181

(22) PCT Filed: May 26, 2009

(86) PCT No.: PCT/AT2009/000218
§ 371 (c)(1),
(2), (4) Date: Dec. 20, 2010

(87) PCT Pub. No.: WO2009/121090
PCT Pub. Date: Oct. 8, 2009

(65) Prior Publication Data
US 2011/0150612 A1    Jun. 23, 2011

(30) Foreign Application Priority Data
Apr. 3, 2008 (AT) .................................. A 519/2008

(51) Int. Cl.
*B65G 17/34* (2006.01)
*B65G 47/49* (2006.01)
*B65G 1/133* (2006.01)
*B65G 1/137* (2006.01)

(52) U.S. Cl.
CPC ...... *B65G 1/1378* (2013.01); *B65G 2201/0261* (2013.01); *B65G 2209/02* (2013.01)
USPC .................................. 198/370.06; 198/477.1

(58) Field of Classification Search
CPC ........ B65G 1/137; B65G 47/04; B65G 47/10; B65G 47/44; B65G 65/02; B65G 1/1371; B65G 1/1373; B65G 1/1376; B65G 1/1378

USPC ................ 186/56, 55; 198/348, 349–349.95, 198/350–358, 361, 363, 364, 367, 198/369.1–369.7, 370.01–370.13, 198/371.1–371.3, 890, 890.1; 414/278, 414/293, 299, 808; 483/63, 64
IPC ............ B65G 1/137,47/04, 47/10, 47/44, 65/02
See application file for complete search history.

(56) References Cited

U.S. PATENT DOCUMENTS

| 4,801,000 | A | * | 1/1989 | Canziani | 198/370.06 |
| 4,815,582 | A | * | 3/1989 | Canziani | 198/370.06 |
| 6,276,509 | B1 | * | 8/2001 | Schuster et al. | 198/370.02 |
| 2006/0229762 | A1 | * | 10/2006 | Schaefer | 700/216 |
| 2009/0299521 | A1 | | 12/2009 | Hansl et al. | |

FOREIGN PATENT DOCUMENTS

| AT | 501896 | 12/2006 | |
| AT | 502982 | 6/2007 | |
| AT | 503638 | 10/2009 | |
| DE | 102004014378 | 10/2005 | |
| EP | 499276 A1 * | 8/1992 | B65G 1/137 |
| WO | 9636547 | 11/1996 | |
| WO | 2006042347 | 4/2006 | |
| WO | 2007053010 | 5/2007 | |

OTHER PUBLICATIONS

International Search Report issued in International Application PCT/AT2009/000218 dated Oct. 7, 2009.

* cited by examiner

*Primary Examiner* — Saul Rodriguez
*Assistant Examiner* — Brendan Tighe
(74) *Attorney, Agent, or Firm* — Schlee IP International, P.C.; Alexander R. Schlee

(57) ABSTRACT

The invention refers to an order picking plant for order picking of articles into order containers. The order picking plant comprises a picking station and a sorter. Between the sorter and order container a number of collection points are provided. Further, the invention relates to a process where the articles are stored intermediately in a collection point between sorter and order container.

6 Claims, 4 Drawing Sheets

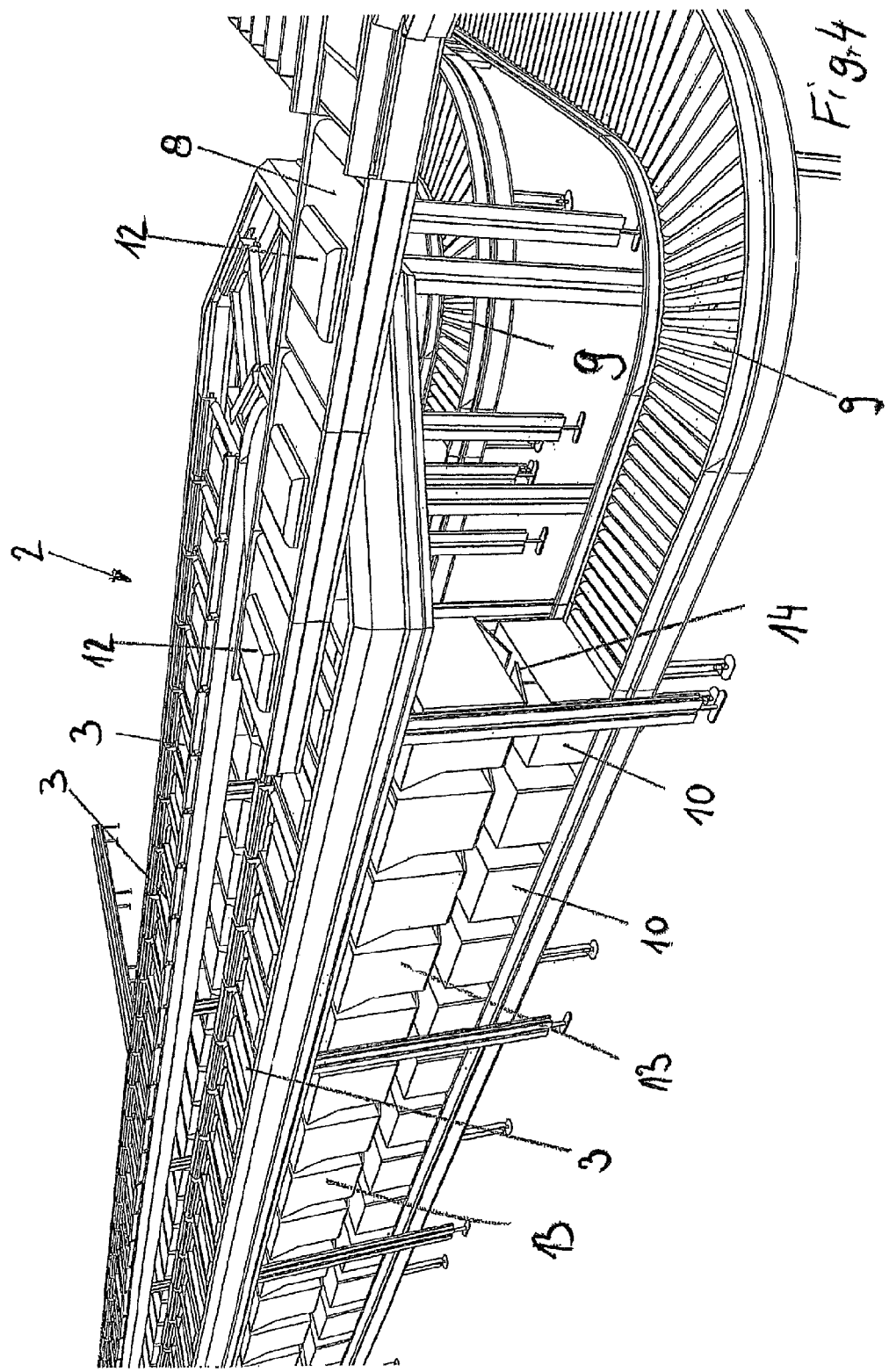

ORDER-PICKING SYSTEM FOR ORDER-PICKING ARTICLES INTO ORDER CONTAINERS

CROSS-REFERENCE TO RELATED APPLICATIONS

This application is a national phase entry based on the International Patent Application PCT/AT2009/000218 filed May 26, 2009 that claims the priority of the Austrian patent application A 519/2008 that was filed on Apr. 3, 2008. The entire content of this prior Austrian patent application is herewith incorporated by reference.

BACKGROUND OF THE INVENTION

The invention relates to an order-picking system for order-picking articles into containers, with a picking station and a sorter.

There are known plants or systems where at a given picking working station one or more different articles corresponding to a predefined order are put into a picking chute by a picker, whereby these articles are subsequently directed into order containers. For example DE 10 2004 014 378 A1 shows such a system. Other systems use the sorter to put several articles one after another into the same order container (also known as destination container). Such a system is also called inverse sorting and shown e.g. in AT 502 982 A1. In the inverse sorting to the contrary to other common picking processes each article is picked individually and of homogeneous categories. With the solution shown in AT 502 982 A1 however only a small number of destinations resp. orders can be processed. Even when the sorter has 100 or 200 order or destination container, this number is limited by the design of the picking plant. Therefore also the total output of the system is limited. This can only be improved by an increased investment for the creation of sufficient sorter end places for the required number of order containers.

SUMMARY OF THE INVENTION

Goal of the present invention is to create a plant or system and a process where it is possible to distribute the articles to more destinations (i.e. order containers) as there are end places at the sorter to allow an economic automation of an inverse picking.

This is achieved according to the invention by a number of collecting point arranged between the sorter and the order container. By this intermediate collecting point a decoupling between sorter and order (destination) container takes place.

DETAILED DESCRIPTION OF THE INVENTION

An improvement of the invention is characterized by the sorter having sorter trays which are passing the picking station continuously, whereby the sorter trays may also be passed by continuously at the single collection points. By this arrangement the picking output can be increased substantially.

If the order containers pass the collection points substantially more order containers as sorter end places can be provided in an easy manner.

The collection point may be designed as chute with a flap, as gravity chute with discharge function or as example as conveying device. According to the good to be sorted (kind of article) the appropriate arrangement may be made. In principal also all different kind of collection points may be provided so that a mixed assortment of articles may distributed to the orders.

An advantage embodiment of the invention is characterized by the order containers being directed over a roll conveyor. With this the particular order container may be directed especially advantageous below the collecting points to achieve an advantage loading.

If there is provided at least one supply belt to supply the articles to the sorter the picking output may be again increased, whereby also a number of supply belts may be provided.

The invention also relates to a process for order picking of articles into order containers whereby the articles are directed to a sorter from a picking station. The process according to the invention is characterized by intermediately storing the articles between sorter and order container in a collection point. By these intermediate collection points a decoupling of sorter and order (destination) container takes place.

An improvement of the invention is characterized by the sorter having sorter trays, which pass the picking station continuously, whereby the sorter trays may also be passed by at the individual collection points. With this arrangement the picking output may be increased substantially.

If the order containers are passed by the collection points substantially more order containers as sorter end places can be provided in an easy manner.

BRIEF DESCRIPTION OF THE DRAWINGS

The invention is now exemplified with the help of the drawings where.

DETAILED DESCRIPTION OF THE DRAWINGS

Figure 1:
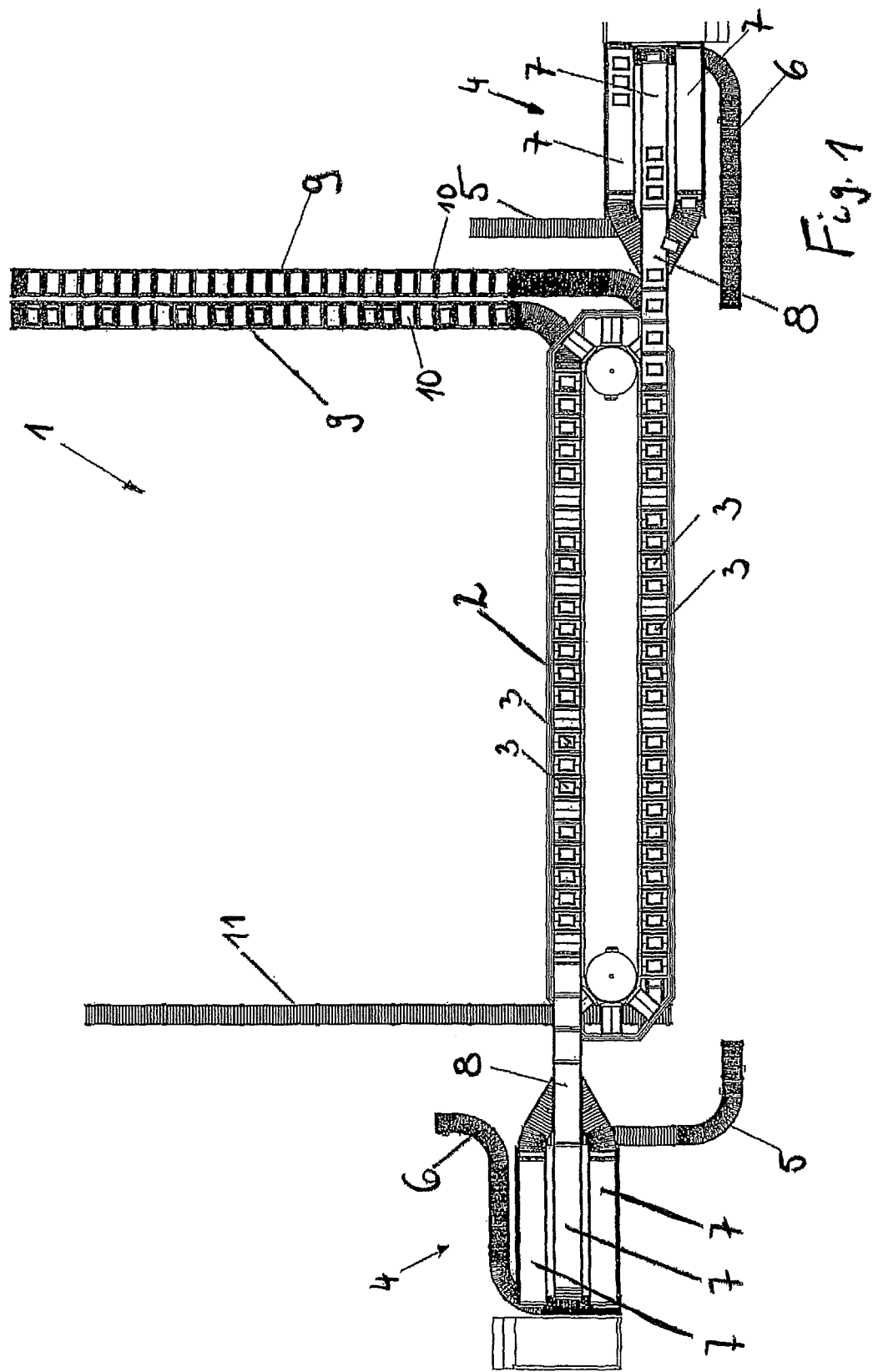
FIG. 1 shows a top view of a picking system according the invention,
FIG. 2 a side view
FIG. 3 a 3D view of a picking system according the invention and
FIG. 4 a cut-out from FIG. 3.

FIG. 1 shows the plan view of an order picking plant 1 according the invention with a sorter 2 which has a number of sorter trays 3. The shown plant has two picking stations 4. Here the articles are fed to the picking station 4 by conveyors 5 and empty resp. partly emptied containers are lead away via conveyors 6. The articles are laid onto a conveyor, by example a conveyor belt 7 by a picker and lead to a so called supply belt 8 which applies the articles selectively to the individual sorter trays 3. The needs for the currently picked articles relevant orders for the individual destinations and thus order containers 10 are combined. This allows the picker to apply individual articles in higher numbers to the sorter 2 resp. the corresponding conveyor belt 7. If the feed of the destination containers with the articles to be picked is in a bunch, the total need for the relevant article of this bunch may be applied all at once. Articles of clothing which differ in size and probably in color are suited especially good, whereby for each order a number of similar articles of this kind are needed. Also for the distribution of other articles where for an order a number of similar articles have to be put together, the process according to the invention may be used advantageously. Via conveyors 9, which may be roll conveyors, belt conveyors or the like the order containers 10 are lead away via conveyors 11, from where they can be shipped.

Figure 2:
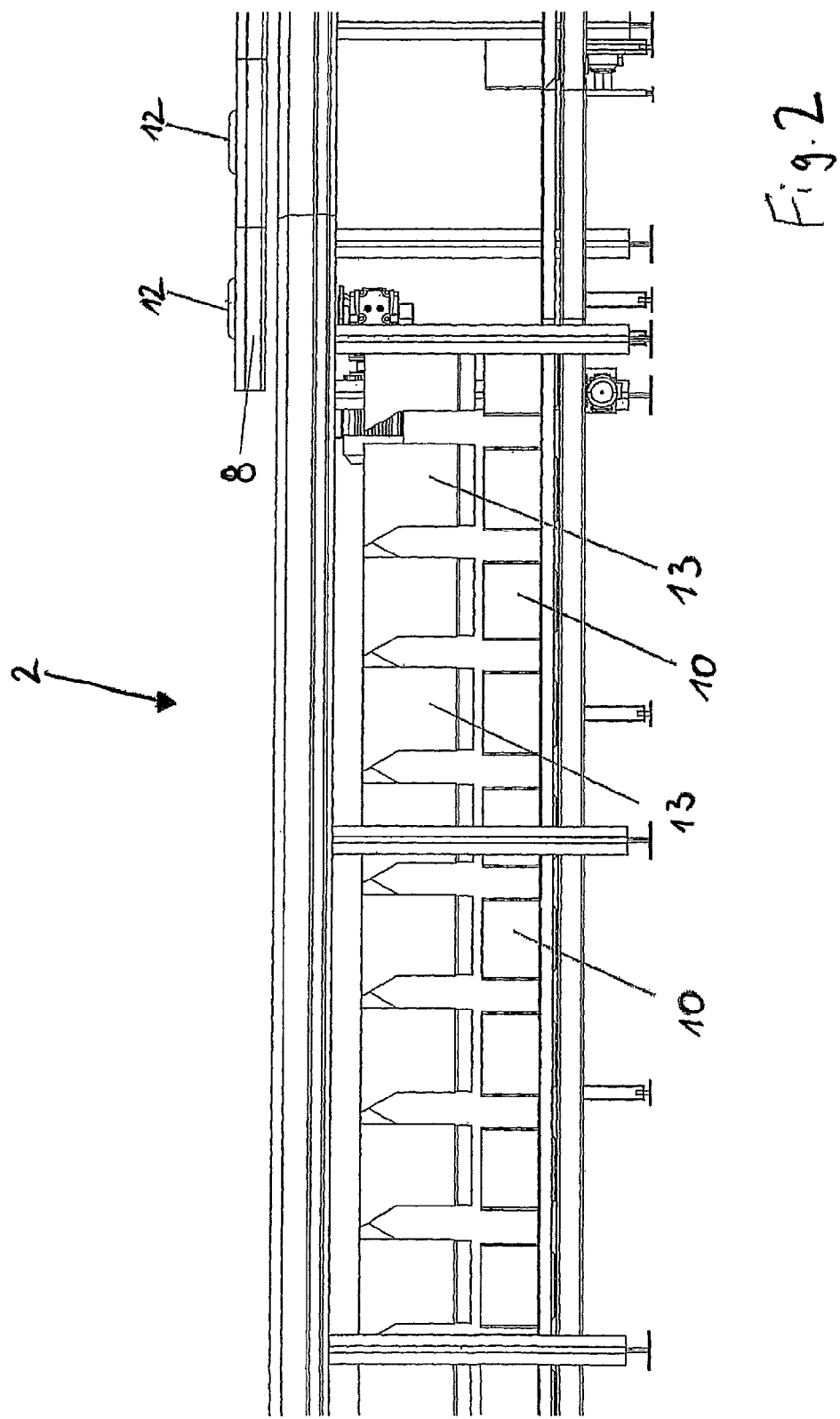

FIG. 2 shows a side view of a sorter 2 with the supply belt 8 on which a number of articles 12 are stored. These articles 12 are lead to the individual collection points 13 by sorter trays (not shown). This collection point 13 is shown here as a chute with a flap. It can also be every suitable device as e.g. a gravity chute with discharge function or a conveyor. The collection point 13 acts as a short term buffer which allows synchronizing the sorter 2 with the approaching order containers 10. One collection point 13 always buffers the need of all the currently picked articles 12 for the approaching corresponding destination container 10.

For major orders also a number of order containers 10 may be used, whereby these containers take the articles from a respective corresponding collection point 13. Sorter 2 and delivery belt 7 resp. supply belt 8 are controlled in such a way that articles 12 foreseen for an approaching order container 10 are dropped into the collection point 13 before the order container 10 reaches this collection point 13.

Figure 3:
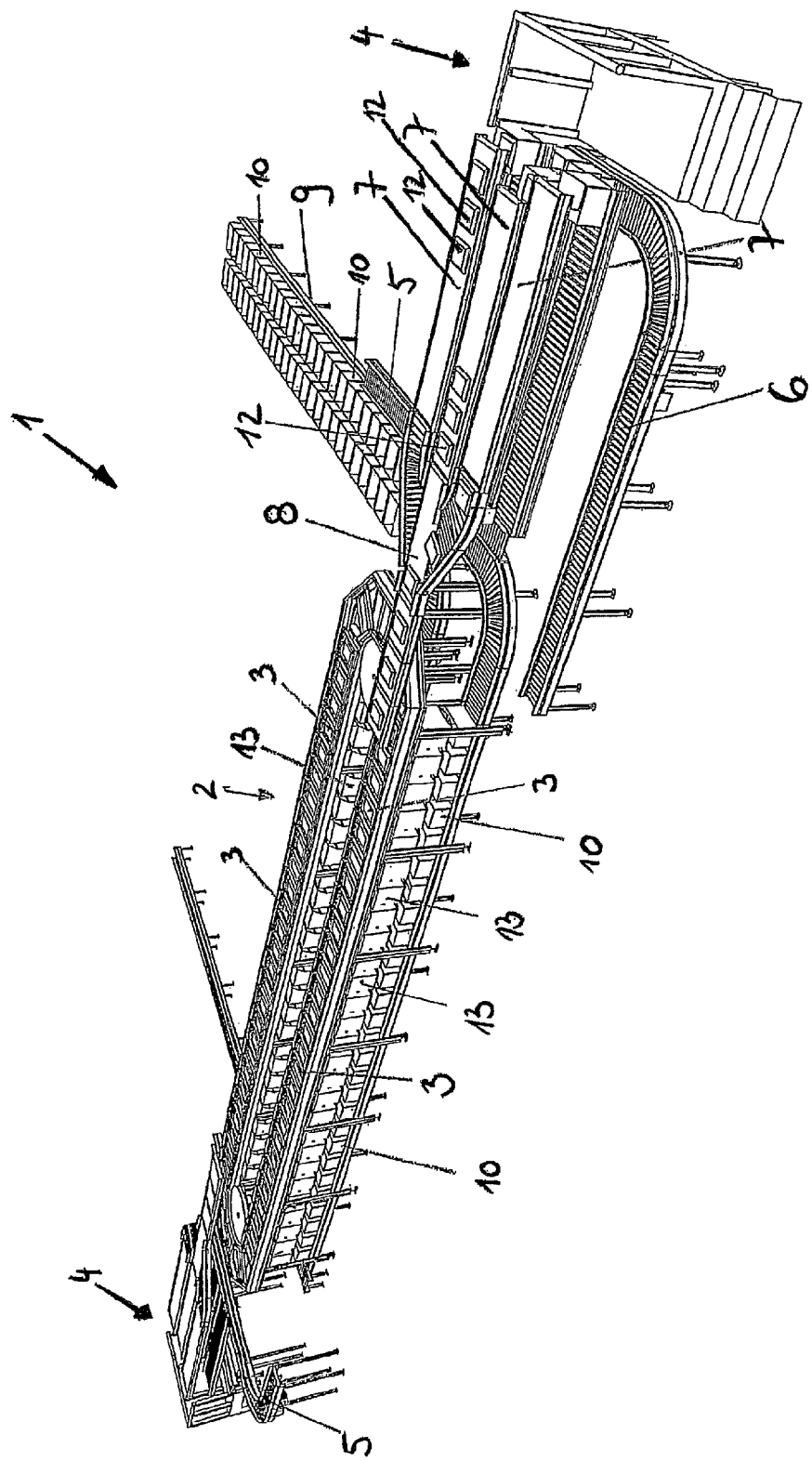

FIG. 3 shows a 3D illustration of the order picking plant 1 according to the invention with a sorter 2 as well two picking positions 4, which each have three conveyor belts 7 to apply articles 12, whereby the articles 12 are delivered to a supply belt 8, which deposits the articles 12 on the individual sorter trays 3. As soon as the sorter tray 3 is above the appropriate collection point 13 the articles 12 which are on the sorter tray 3 are dropped into the collection point 13. It is also possible that a number of sorter trays 3 drop the articles 12 into the same collection point 13, so that also a number of different articles are stored in one collection point 13. As can be seen from FIG. 3 the individual articles 12 can be dropped into the appropriate collection point 13, independently which picker has deposited the articles, as the sorter forms a closed circle and each sorter tray 3 passes over each collection point 13.

FIG. 4 shows a cut-out from FIG. 3. Here it can be seen especially well the sorter 2 with the individual sorter trays 3, which deliver the articles 12 into the collection points 13. Further it can be seen that the collection points 13 have flaps 14, which are opened as soon as the dedicated order container (destination container) 10 is passed by underneath.

As again and again new order containers 10 are passed by the orders are not limited to a fixed number by the apparatus as it is with known order picking plants. With this an especially economic picking can be achieved.

The invention is not limited to the shown embodiments. So, as already describes, it is possible that the collection point is provided also as gravity chute or conveyor or other device, which fulfills the same function. By example, the sorter may also be designed as so called split tray sorter or with a transverse belt, to e.g. distribute also goods which may be easily damaged.

What is claimed is:

1. Order picking plant for the order picking of articles and placing these in order containers, the order picking plant comprising:
   a picking station;
   a sorter with a sorter tray conveying path forming a closed circle and comprising a plurality of sorter trays;
   a line of a number of collection points that are lined up underneath the sorter tray conveying path so that the line of the number of collection points extends over at least a part of the sorter tray conveying path in parallel and vertically offset underneath the sorter tray conveying path;
   an order container conveying path extending in parallel and vertically offset underneath the line of the number of collection points so that the line of the number of collection points is sandwiched between the sorter tray conveying path and the order container conveying path; wherein
   the sorter is configured such that each sorter tray passes over each of the collection points located underneath the sorter trays, said collection points being configured to serve as short term buffers synchronizing the sorter, which sorter is configured to drop articles from the sorter trays into the collection points;
   the sorter is configured such that each of the order containers passes by underneath each of the collection points that are configured to drop articles into the order containers; and
   the sorter forms a closed circle that is configured to pass each one of the sorter trays continuously by the picking station and continuously over each one of the collection points.

2. Order picking plant according to claim 1, wherein the collection point is designed as chute with a flap.

3. Order picking plant according to claim 1, wherein the collection point is designed as gravity chute with delivery function.

4. Order picking plant according to claim 1, wherein the order containers are passed by the collection points by a conveyor.

5. Order picking plant according to claim 1, wherein for the supply of the articles to the sorter at least one supply belt is provided.

6. A method of operation an order picking plant for order picking of articles into order containers, the order picking plant comprising:
   a picking station;
   a sorter with a sorter tray conveying path forming a closed circle and comprising a plurality of sorter trays; and
   a line of a number of collection points that are lined up underneath the sorter tray conveying path so that the line of the number of collection points extends over at least a part of the sorter tray conveying path in parallel and vertically offset underneath the sorter tray conveying path;
   an order container conveying path extending in parallel and vertically offset underneath the line of the number of collection points so that the line of the number of collection points is sandwiched between the sorter tray conveying path and the order container conveying path; wherein
   the sorter is configured such that each sorter tray passes over each of the collection points located underneath the sorter trays, said collection points being configured to serve as short term buffers synchronizing the sorter, which sorter is configured to drop articles from the sorter trays into the collection points;
   the sorter is configured such that each of the order containers passes by underneath each of the collection points that are configured to drop articles into the order containers; and
   the sorter forms a closed circle that is configured to pass each one of the sorter trays continuously by the picking station and continuously over each one of the collection points; said method comprising:
   moving the sorter trays by a continuous movement by the picking station;
   supplying the articles from the picking station into the sorter trays of the sorter;
   passing each one of the sorter trays by a continuous movement over each one of the collection points;
   dropping articles from the sorter trays into the collection points;
   intermediately storing the articles between the sorter and the order container at the collection points;

passing each one of the order containers by a continuous movement underneath each one of the collection points; and dropping articles that have been stored intermediately at the collection points into the order containers.

* * * * *